United States Patent [19]

Greene

[11] 3,874,470

[45] Apr. 1, 1975

[54] PRESSURE-RESPONSIVE DISPLACEMENT CHANGER FOR VEHICULAR DRIVE SYSTEM HAVING A VARIABLE DISPLACEMENT PUMP

[76] Inventor: Clarence Kirk Greene, Arlington Apt., 100 N. Arlington Ave., Reno, Nev. 89501

[22] Filed: May 31, 1973

[21] Appl. No.: 365,493

[52] U.S. Cl............ 180/14 A, 180/14 D, 180/44 M
[51] Int. Cl............................................. B62d 59/04
[58] Field of Search.... 180/14 K, 14 A, 14 D, 53 R, 180/44 F, 44 M, 22, 53 CD, 66 R

[56] References Cited
UNITED STATES PATENTS

| | | | |
|---|---|---|---|
| 3,354,978 | 11/1967 | Budzich............................ | 180/44 M |
| 3,361,223 | 1/1968 | Bauer................................ | 180/44 M |
| 3,374,847 | 3/1968 | Budzich............................ | 180/14 D |
| 3,612,202 | 10/1971 | Moon................................ | 180/14 A |

Primary Examiner—David Schonberg
Assistant Examiner—Terrance L. Siemens
Attorney, Agent, or Firm—Oswald H. Milmore

[57] ABSTRACT

A drive system for vehicle means, e.g., a truck-trailer combination, having primary and secondary driving elements and a power plant, includes a torque divider having an input shaft driven by the power plant, a first output which drives the primary driving element mechanically and a second output including a variable displacement pump having displacement changing means and interconnected to a hydraulic motor which drives the secondary driving element, and means for reducing the pump displacement upon a rise in the hydraulic pressure in the interconnecting duct which is normally at the lower pressure, i.e., the normal return duct. Automatic displacement change is effected by a movable wall exposed to the pressure in the said duct; this wall may be a single-action piston, or may be opposed by the pressure in the other duct, so that the wall moves in response to the difference in hydraulic pressures in the two interconnecting ducts.

16 Claims, 5 Drawing Figures

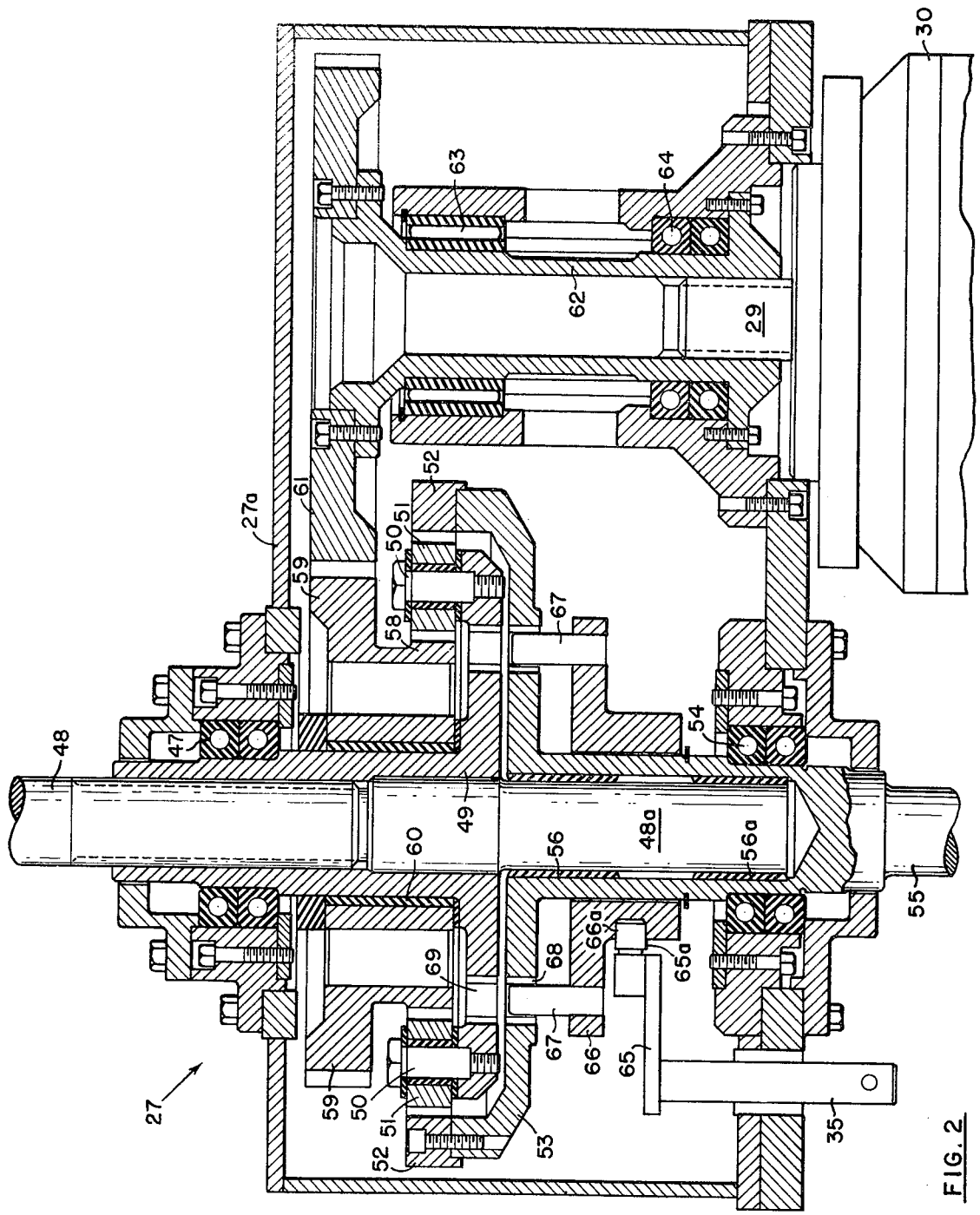

PRESSURE-RESPONSIVE DISPLACEMENT CHANGER FOR VEHICULAR DRIVE SYSTEM HAVING A VARIABLE DISPLACEMENT PUMP

The invention relates to drive systems for vehicles having a power plant which is coupled to the input of torque-dividing means having two outputs, of which one is mechanically coupled to a primary driving element and the other supplies hydraulic power to one or more hydraulic motors driving a secondary driving element, situated on a vehicular transverse axis displaced from that on which the primary driving element is situated. More particularly, it is concerned with a device for changing automatically the hydraulic pressure in the output conduit in response to pressure changes in the hydraulic conduits.

The torque-dividing means may be a differential torque divider, having one output coupled to the primary driving element and the other to a variable-displacement pump; but it may also have other embodiments, such as a differential pump, as is disclosed in my prior U.S. Pat. Nos. 3,680,652 and 3,702,642, issued on Aug. 1, 1972 and Nov. 14, 1972, respectively, having the pumps thereof modified to permit variable displacements.

The invention has especial, although not exclusive, utility in truck-trailer combinations wherein the trailer carries the secondary driving element and the hydraulic motor, the primary driving element being on the truck or tractor, wherein it was found to be advantageous to reduce the pump displacement under certain operating conditions to reduce the danger of jack-knifing of the combination.

The danger of damage to truck-trailer combinations by jackknifing is serious and great loss results from this cause, especially when the combination is being decelerated or retarded when moving down-grade with the engine in "compression," i.e., acting as a brake. It is desirable to reduce the compressive force on the trailer draw-bar, permissibly or desirably placing it into tension, under these conditions, as well as when backing up the combination.

While trailers are usually equipped with brakes, the brakes have not always been effective to prevent jack-knifing. At times, the brakes are not applied sufficiently or soon enough by the operator. Systems permitting a change in the displacement of the pump (or of the hydraulic motor) also require prompt action on the part of the operator and again do not eliminate the danger of jack-knifing.

It is an object of the invention to provide a drive system of the type indicated (i.e., including a torque divider having two outputs driving respectively primary and secondary driving elements, the latter including a hydraulic system having a variable-displacement pump) having means sensitive to an increase in pressure in a conduit from the pump for automatically increasing the back-pressure in the return conduit from the hydraulic motor.

Another object is to vary the displacement of the pump, driven by one of the outputs of a differential torque divider, automatically in response to changes in the hydraulic pressure in one or both of the conduits which connect the pump to the hydraulic motor, e.g., when the pressure in what is normally the return line rises.

A further object is to reduce the danger of jack-knifing by automatically increasing the ratio of the power from or to the hydraulic motor to the power from or to the primary driving element under certain operating conditions.

Still another object, attained in some embodiments, is to reduce the pump displacement automatically upon a rise in the hydraulic pressure in the interconnecting conduit which normally (during forward movement of the vehicle under power) is at a lower pressure than the other interconnecting conduit and then serves to return hydraulic fluid from the motor to the pump.

Still another object, also attained in some embodiments, is to reduce the pump displacement automatically upon a rise in the hydraulic pressure in the conduit specified in the foregoing object relatively to the other interconnecting conduit.

Additional objects will become apparent from the following description.

In summary, the drive system for vehicle means having a power plant and primary and secondary driving elements situated on different transverse axes, of which the secondary driving element is driven by a hydraulic motor, includes a torque-dividing means driven by the power plant and having two outputs, one of which is coupled, mechanically, to the primary driving element and the other of which, including a variable-displacement pump, is hydraulically interconnected by ducts to the hydraulic motor, and means including a movable wall (such as a piston or a bellows) connected to the pump for varying the pump displacement, the said wall being exposed to the pressure of hydraulic fluid in the duct which is normally at a lower pressure than the other duct when the vehicle means is moving forwardly under power.

The movable wall is preferably connected to a displacement-changing element of the pump in a manner to decrease the pump displacement upon a rise in the hydraulic pressure in the specified duct. Thereby the back-pressure in the said duct (which is normally the return line) is increased automatically.

Exposure of the movable wall to the fluid pressure is usually effected by interconnecting the interior of a chamber, such as a cylinder, with the specified duct, the movable wall being advantageously a piston. In one embodiment, a single auxiliary duct is used for this interconnection. In another embodiment, the movable wall is a double-acting piston (or a pair of pistons) and the movable wall acts differentially, in response to a difference in the pressures in the two ducts to the motor, a second auxiliary duct from the said other duct to the motor being provided to oppose movement of the movable wall.

To avoid too rapid a change in the pump displacement, a flow-restrictive device, such as an orifice plate or an elongated narrow passageway, may be provided in the auxiliary duct means, which may connect the space adjoining the movable wall to the duct which is normally at a lower pressure, or two auxiliary ducts, including that mentioned and another connecting the opposite side of the wall (or a separate but connected movable wall) to the other duct.

It is evident that the movable wall should not reduce the pump displacement to zero, and for this purpose there is provided some means, such as a stop limiting the extent of movement of the wall, to cause a reduction in the pump displacement to only a limited degree, say down by 20 to 40 percent of the pump's normal or maximum displacement.

In the preferred embodiment described herein, the torque-dividing means is a differential torque divider having two mechanical outputs. Any type of such differential torque divider may be used, and only one form is illustrated herein; additional types are described in my copending patent application, Ser. No. 342,219, filed Mar. 16, 1973 in the United States. It is evident that the mechanical interlock between the torque divider input and its first output, shown in the said application, is not essential to the present invention.

Any form of variable-displacement pump, preferably of the positive displacement type, may be used, and the present invention is not limited to the details of the pump nor to the use of the tiltable swash plate illustrated herein.

Advantageously, the secondary drive element includes one or both wheels of a trailer, driven by a hydraulic motor.

When the pump displacement is high or at maximum, the input shaft of the torque divider can, by a choice of the gear sizes and of the relative displacements of the pump and motor, be given any desired constant relation, e.g., equal or other, to the torques applied to the primary and secondary driving elements; it being noted that, due to engagement with the same road surface, the truck and trailer wheels rotate in a fixed velocity ratio when the truck-trailer combination is moving straight ahead. This equality in velocities is herein called the "normal displacement relation," but is not essential to the practice of the invention. The torque from the torque divider's input shaft is divided in a predetermined ratio, such as 60 percent to the truck wheels and 40 percent to the trailer wheels, in accordance with the design of the torque divider and the said relative displacements and the wheel diameters and interconnecting gears, or in some other selected ratio; but regardless of the ratio of distribution, the condition at maximum (or high, near maximum) displacement of the pump is herein called the "normal displacement relation." Since power is equal to torque times angular speed, it follows that the power is also divided in a ratio which is always the same when the normal displacement relation prevails.

When, however, the vehicle means is retarded, the secondary driving element, such as trailer wheels, transmit power to the power plant, which operates under compression as a brake. Power is also transmitted from the primary driving element, such as the truck wheels, to the power plant. Any such braking action, regardless of the torque or power distribution, causes the pump to be driven as a motor, whereby the pressure in the interconnecting duct which is normally the low-pressure return duct from the motor rises. This increase in hydraulic pressure moves the movable wall to reduce the pump displacement, causing the pump to rotate faster. Thereby the power delivered by the pump to the power plant is increased relatively to the power delivered from the truck wheels to the power plant, and the power plant is made to rotate faster, absorbing more braking power. Since the power delivered from the pump is increased relatively to that delivered from the primary driving elements, the braking of the trailer is automatically increased, thereby reducing the danger of jack-knifing, since the compression on the trailer draw-bar is reduced or the draw-bar stress is placed into tension. Similarly, when the truck-trailer combination is moved rearwardly, the torque divider and pump and hydraulic motor are driven in reverse, and the duct which normally acts as the low-pressure return duct acts as the high-pressure delivery duct; this causes the pump displacement to be reduced, increasing the power delivered to the trailer.

Reduction of the pump displacement causes the pressure in the normally low-pressure, return duct to rise. This is of advantage in special applications, as when hydraulic braking is used, involving the placement of a throttle valve, optionally equipped with a heat-exchanger to draw off excess heat, between the variable displacement pump and the juncture of the said duct with the auxiliary duct to the movable wall. Any throttling of this brake valve causes an increase in the hydraulic pressure in the said duct and auxiliary duct, thereby increasing the back-pressure in the part of the duct adjoining the pump.

The invention will be further described with reference to the accompanying drawings showing certain preferred embodiments, by way of illustration, wherein:

FIG. 2 is a longitudinal section through one form of a differential torque divider used in the drive system;

FIRST EMBODIMENT

Figure 1:
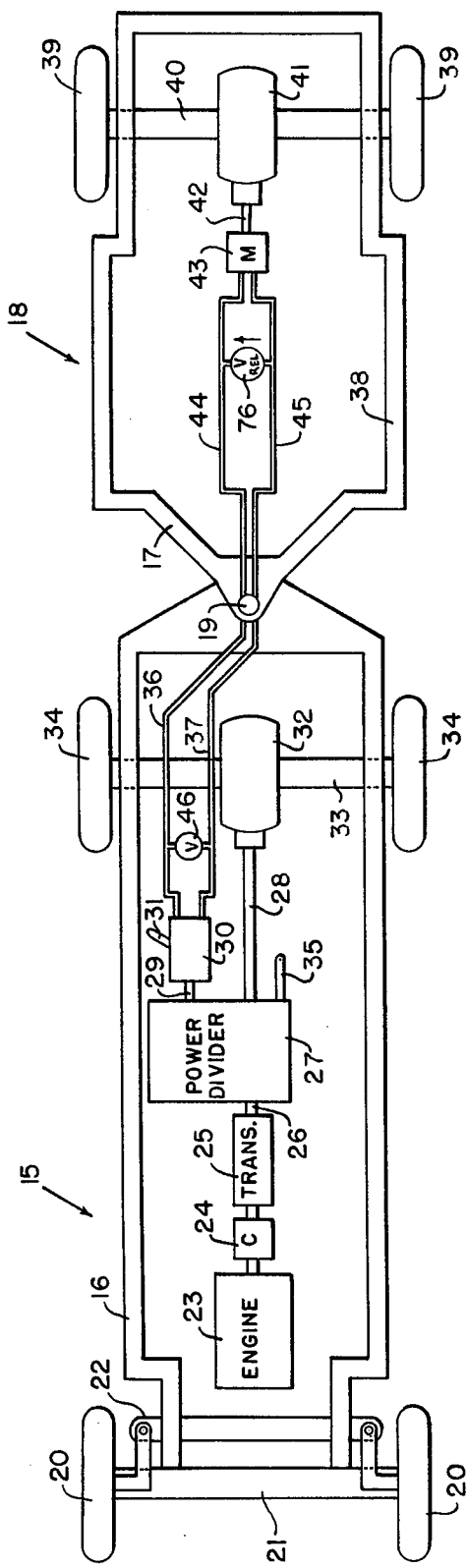
FIG. 1 is a schematic plan of a truck-trailer combination having the drive system of the invention.

Referring to FIG. 1, the vehicle means includes a truck or tractor 15 having a chassis 16 supporting a draw-bar 17 of a trailer 18, illustrated as a semi-trailer but permissibly of any desired type, which is coupled to the truck by a fifth wheel 19. The truck has steerable front wheels 20, which are interconnected by an axle housing 21 and are provided with steering mechanism, generally indicated at 22. The truck carries a power plant 23 which is coupled through a clutch 24 and a speed-changing gear box 24 (which preferably includes a reversing gear) to the input shaft 26 of a differential torque divider 27. This divider has two output shafts, of which the first, shown at 28, is coaxial with the input shaft and is coupled mechanically to the input shaft of the truck differential gear unit 32, this gear unit driving the primary driving element, viz, the two rear truck wheels 34 through axles situated within transverse housings 33. The second output (which may be annular and include the gear 59 shown in FIG. 2, being rotatable about the axis of the input shaft) is mechanically coupled to the input shaft 29 of a variable displacement pump 30, which has a lever 31 for changing the pump displacement.

In one embodiment, the torque divider has a slidable rod 35 which, when pushed into the divider (toward the left in FIG. 1) mechanically interlocks the input shaft 26 to drive the first output shaft 28 directly. When the rod 35 is out from the torque divider differential action between the two ouputs occurs. The pump 30 has ports to which are connected a high-pressure outlet duct 36 and a low-pressure return duct 37 (these functional designations being applicable only when the truck-trailer combination is moving forwardly under power). The ducts 36 and 37 are coupled hydraulically to corresponding ducts 44 and 45 on the trailer by suitable means, as through connections associated with the fifth wheel 19. As will be explained, the fluid pressures in these ducts are variable and are, under some conditions, reversed.

The trailer 18 includes a chassis 38 and a pair of driving wheels 39, constituting the secondary driving element, the wheels being driven by axles within transverse housings 40 from a differential gear unit 41 which has an input shaft 42. A hydraulic motor 43, suitably secured to the chassis 38, is mechanically coupled to the input shaft 42 and is connected to the ducts 44 and 45 to be driven by the pump 30. Optionally, a by-pass duct containing a pressure relief valve 76 is provided (shown on the trailer, but permissibly on the truck) to pass fluid from the return or outlet duct 45 to the supply or inlet duct 44 when the hydraulic pressure in the former exceeds too greatly that in the duct 44, "too greatly" being determined by the setting of the valve 76 and depending, in magnitude, upon the design of the system, e.g., 100 to 1,000 psi.

A by-pass duct, including a valve 46 operable from the operator's compartment on the truck, interconnects the ducts 36 and 37 (and, hence, the ducts 44 and 45).

Referring to FIG. 2, the differential torque divider 27, in a preferred embodiment, comprises a housing 27a, secured to the chassis 16 and having bearings 47 for rotatably mounting the input shaft 48 (which is coupled to the input shaft 26). The shaft 48 has splined thereto a planet carrier 49 which carries a plurality, such as three, spindles 50, each spindle carrying for free rotation thereon a planet gear 51. The radially outer parts of these planet gears mesh with an internal gear 52, which is bolted to a plate 53; this plate is rotatably mounted in the housing 27a by bearings 54, which afford both radial and axial support and have their inner races fixed to the output shaft 55 which is shown to be integral with the hub of the plate 53. The shaft 48 is coaxial with the output shaft 55 and has a reduced end 48a, which is radially supported within the output shaft by bushings 56 and 56a.

The radially inner parts of the planet gears mesh with a sun gear 58 which is fixed to, e.g., integral with, a larger-diameter spur gear 59, which constitutes the second output. These gears are supported rotationally from the input shaft 48 by a bushing 60. The gear 59 meshes with a spur gear 61, which may have a like or a different diameter, and which is fast on a secondary shaft 62, mounted in bearings 63 and 64. The shaft 62 is coupled drivingly to the input shaft 29 of the pump 30.

The rod 35 is fixed to a shift arm 65 having an extension 65a, which is situated within an annular groove 66a of a collar 66. This collar is axially slidable on but rotates together with the output shaft 55 and has fixed thereto a plurality of pins 67, which extend through holes 68 is the plate 53 and are located to enter the holes 69 in the planet carrier 49. When the rod 35 is pushed into the housing 27a these pins lock the planet carrier 49 rotationally to the plate 53, whereby the input shaft 48 and the output shaft 55 are mechanically interlocked.

Figure 4:
FIG. 4 is an elevation of a part of the displacement control lever, on an enlarged scale, looking in the direction of the arrows 4—4 of FIG. 3.
Figure 3:
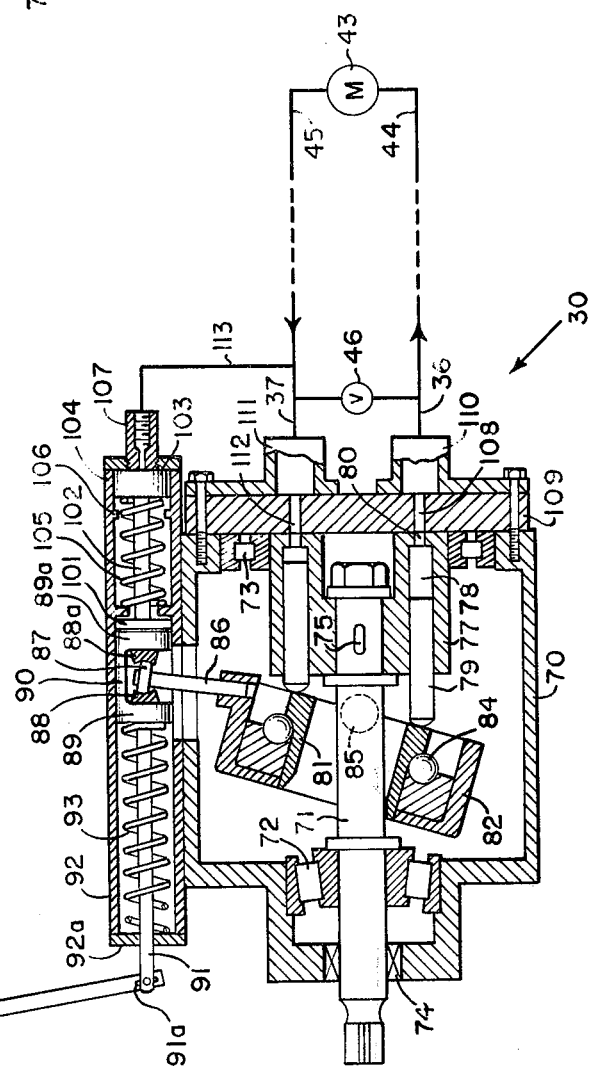
FIG. 3 is a longitudinal section, partly in elevation and partly diagrammatic, showing a variable displacement pump used in the drive system.

As is shown in FIGS. 3 and 4, the pump, in one embodiment, includes a housing 70 within which is a rotatable drive shaft 71, supported by bearings 72 and 73 and optionally provided with sealing means 74, this shaft being coupled to the shaft 29. Rotatable with the drive shaft, e.g., by means of keys 75, is a cylindrical block 77 containing a plurality, e.g., five to 15, pumping chambers 78, each chamber containing a reciprocable piston or pump rod 79 and having a port 80 of reduced diameter. The bearings 72 and 73 have their outer races fixed to the housing 70, and the latter supports the drive shaft through the block 77, to which the inner race is fixed. The outer ends of the pump rods 79 are suitably shaped to rotate on and to be urged into the chambers 78 by a swash plate 82. It is understood that various arrangements may be used. In the simple arrangement shown, these rods have convexly curved outer ends, bearing compressively against a common ring 81 which is freely rotatable on the swash plate by means of bearing balls 84. Since these rods, at any finite inclination of the swash plate relatively to the plane perpendicular to the drive shaft, have at least some radial back and forth movement relatively to the ring 81, the rod ends and the surface of this ring are advantageously polished and hard. The swash plate 82 is pivotally mounted for rotation relatively to the housing 70 by a pair of coaxial pivot shafts, of which one is indicated at 85.

For varying the inclination or tilt of the swash plate 82, it has a flange through which extends a hole receiving slidably a positioning stem 86. This stem carries at its outer end a segment of a sphere 87, which engages and is movable relatively to a pair of bearing blocks 88, 88, having mating concave surfaces. These blocks are held together by a plurality of straps, one of which is shown at 90, which are fixed to (or, as shown, integral with) confining blocks 89 and 89a. The block 89 is fixed to a rod 91, which extends through a hole in the end wall 92a of a cylindrical housing 92 and is urged by a coiled compression spring 93 to rotate the swash plate 82 to maximum inclination. (This corresponds to maximum pump displacement.) The rod 91 is pivotally connected, by a pin extending through an elongated hole 91a, to a lever 31 (previously mentioned) which is pivoted at 94 to a part of the chassis 16 and extends into the motor vehicle operator's compartment. Also fixed to the chassis, usually within said compartment, is means for selectively locking the lever 31 at various angular positions, said means being illustrated by an arcuate positioning member 95, appearing in FIGS. 3 and 4 and having a plurality of notches 96 for receiving the toothed end of a position-determining rod 97. The lever 31 is normally free to move angularly, the toothed end of the rod 97 being usually out of the notches 96. For this purpose, the rod 97 is rotatable but axially fixed (except for limited spring-opposed movement) within a sleeve 98, which is pivotally mounted on the lever 31 to permit the toothed end of the rod 97 to be raised from the notches and turned to prevent reengagement, thereby rendering the rod 97 inoperative. The rod 97 is secured to the sleeve 98 by a spring (not shown) which pushes the rod to cause a tab 99 to enter one of several, e.g., two notches 100 in the end of the sleeve (only the notch 100 which is not occupied by the tab 99 being shown in the drawing). Thereby, when the rod 97 is rotated, say 90°, from the position illustrated, the toothed end of the rod is and remains free from the notches in the arcuate member 95, and the lever 31 is freely movable. As is obvious, other mechanisms for selectively locking and unlocking the lever 31 from a predetermined angular position may be substituted.

Abutting the block 89a but optionally separable therefrom is a block 101, which carries a rod 102 abutting a piston 103. This piston is slidable within a cylindrical housing 104. A coiled spring 105, preferably weak, bears between this piston and an inwardly projecting part of the housing to urge the piston to the position shown (i.e., toward the right, as viewed in FIG. 3). Stop means, such as radially inwardly projecting flanges or ribs 106 on the housing, limit the movement of the piston 103, so that movement of the piston cannot reduce the inclination of the swash plate to reduce the pump displacement beyond a limited amount, such as 0.6 to 0.8 of maximum, it being apparent that other limits may be used. The end of the cylinder 104 has connected thereto, preferably through a flow-restrictive fitting 107, which permits only a slow flow of fluid therethrough, an auxiliary connection to the duct 37. The fitting 107, which may be omitted, and which may be replaced by a long duct of small bore, is to prevent too rapid a flow of fluid into the cylinder 104, to avoid shock to the vehicle.

Reverting to the pump construction, fluid under pressure is flowed from the pumping chambers 78 through the passages 80 of lesser diameters into semi-circular grooves or passages 108, which are formed in a valve plate 109 while the pistons 79 are moving the contract the pumping spaces. The grooves 108 deliver the fluid through a semi-circular or localized fitting 110 to the normally high-pressure duct 36. Similarly, fluid from the duct 37 is, under normal, forward operation, taken in through a fitting 111 and a semi-circular groove or passage 112 formed in the valve plate, while the pistons 79 are enlarging the pumping spaces. The lands separating the grooves 108 and 112 are sufficiently long (in the circumferential direction) to close at least one of the ports 80, thereby preventing by-passing of fluid while a pumping chamber in which a rod 79 is at top or bottom dead center is opposite to the lands; therefore each groove 108 or 112 is less than 180° in arc.

The hydraulic fluid from the fitting 110 is, during the forward operation of the vehicle means, passed through the ducts 36 and 44 to the hydraulic motor 43, and this fluid, normally at a lower pressure, is returned through the ducts 45 and 37 to the fitting 111. In reverse operation (controlled by the reversing gear in the gear box 25) fluid is delivered from the fitting 111 through the ducts 37 and 45 to the pump and is returned through the ducts 44 and 36 to the fitting 110. In forward operation, the pressure in the duct 37 may rise relatively to that in the duct 36, as is explained hereinafter.

The auxiliary duct 113 interconnects the normal return duct 37 to the cylinder 104, urging the piston 103 to compress the spring 105, this, if of sufficient pressure to overcome the force of the spring and cause movement of the piston, reduces the pump displacement.

It will be noted that, in this embodiment, which is merely exemplary, the cylinders 92 and 104 close off the interior of the pump housing 70 at its upper part, which housing is partly open to permit the positioning rod 86 to project upwards and have freedom of movement; thereby any leakage from the cylinder 104 flows into the pump housing. However, as was explained previously, this invention is not limited to the embodiment shown and described; specifically, there need not be a piston movable within a cylinder to change the pump displacement. It will be understood that the pump 30 will, in practice, be usually provided with additional auxiliary equipment, such as a sump for receiving leaked hydraulic fluid from various parts of the system, including fluid collected from within the pump housing 70 and the motor 43, cooling means for fluid, and auxiliary pumps and flow lines (such a pressurizing pump, usually a gear pump, for supplying the principal pump 30), and, optionally, means for lubricating the ends of the pumping rods 79, the bearings 72 and 73 and the balls 84, the blocks 88 and 88a, etc., pressure relief valves, and cooling means for returned fluid when pressure or hydraulic braking is used; these are not shown because they are not parts of the present invention.

OPERATION

For purposes of describing the operation, only certain commonly encountered conditions are described, it being evident that others may arise.

During normal forward movement of the vehicle means, with the transmission 25 in forward drive (at any selected speed) power is delivered by the differential torque divider 27 to the truck wheels 34 in a proportion of the power delivered to the input shaft 26 –48, and to the trailer wheels 39. The proportions of the torque delivered to the truck and trailer wheels is determined by the gear ratios in the torque divider and gearing to the pump, and by the relative displacements of the pump and motor, influenced, in turn, by the gearing between the motor and the trailer wheels. For example, 60% of the torque may be transmitted to the truck wheels and 40% to the trailer wheels; other proportions may, however, be used, e.g., when a full trailer or a combination of more than one trailer is used. It is assumed that the control rod 35 is pulled out, so that differential action prevails; for operations with this rod pushed in, reference is made to the aforesaid copending patent application Ser. No. 342,219.

When the vehicle operator reduces the supply of fuel to the power plant, as by taking his foot partly or wholly from the accelerator pedal, the motor 43 continues to rotate, being driven by the trailer wheels, and the motor pumps hydraulic fluid at a rate greater than that which acceptable by the pump intake; therefore, the pump 30 is driven as a motor and the pressure in the normal return duct 37 rises. This, if the pressure rise is sufficient, causes the piston 103 to move toward the left (as viewed in FIG. 3, and assuming that the rod 97 is turned to disengage it from the notches in the arcuate member 95). This reduces the pump displacement via the block 88a, the rod 86 and the swash plate, causing the pump to rotate faster than previously in relation to the vehicular ground speed and driving the shaft 26, to cause rotation of the power plant output shaft at an increased speed. This increases the braking power absorbed by the power plant. For example, assuming that the power plant torque is, after reduction of the fuel flow, to remain constant, the braking power accepted by the power plant, which is equal to the product of the torque and the rotational speed, increases. Since the mechanical coupling of the torque divider to the truck wheels and the effective ratio of the hydraulically-coupled trailer wheels to the input torque are fixed, for a given pump displacement, the wheels rotating on the same ground, the braking effect of the power plant on the vehicle means increases. But a reduction in the displacement of the pump causes more power to be delivered from the hydraulic system, in relation to the power from the truck wheels, so that a sufficient rise in the pressure in the duct 37 causes an increase in the braking force applied to the trailer wheels in relation to that applied to the truck wheels. This holds the trailer back, reducing the compressive force on the trailer's draw-bar 17, or even placing it into tension (the latter condition of the draw-bar being herein included in the reduction of compressive force). This greatly reduces the danger of jack-knifing, and the beneficial effects are realized both when the trailer-truck combination is decelerated and when it is held back, as on a long downgrade.

It may be noted that, with most spring forces, the piston 103 moves fully against the stop 106, to reduce the pump displacement to the maximum extent permitted by this travel. This is due to the fact that any decrease in pump displacement results, in most situations, in an increased speed of the pump and usually causes a further increase in the pressure in the duct 37. To avoid too great a decrease in the pump displacement, the limiting means, such as the stop 106, is important.

When the vehicle means is driven backwards, as by shifting the transmission gear box 25 into reverse, the torque divider and the pump are driven in reverse. The duct 37 now becomes the conduit through which the hydraulic fluid at the higher pressure is delivered to the motor 43 and the duct 36 becomes the low-pressure return duct. Since the pressure in the duct 37 is increased, the piston 103 is moved to reduce the pump displacement, causing the pump to turn faster and increasing the ratio of the power delivered hydraulically to the mechanical power of the truck wheels. This similarly reduces the compressive force on the draw-bar to reduce the danger of jack-knifing.

SECOND EMBODIMENT

Figure 5:
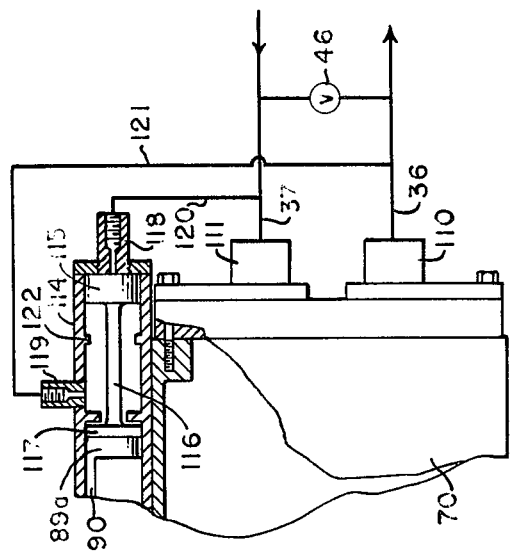
FIG. 5 is a fragmentary view of a part of FIG. 3, showing an alternative construction.

In the modification shown in FIG. 5, the cylinder 104 and its contents are replaced by a cylinder 114 which contains a piston 115, having fixed thereto a rod 116. The rod 116 is fixed to a block 117 which is in abutting relation to and separable from the block 89a, previously described. The cylinder 114 has, in communication with opposite sides of the piston 115, flow restrictive fittings 118 or 119 (which may be omitted or replaced by other means, as was noted above for the fitting 107) through which the cylinder parts are connected respectively by auxiliary ducts 120 and 121 to the ducts 37 and 36. Stop means 122, corresponding to the stop 106, limits movement of the piston 115 in the direction to reduce the pump displacement, at the limits previously noted. Other reference numbers in this view denote parts previously described.

OPERATION—SECOND EMBODIMENT

Operation is as described for the first embodiment, but the spring 105 is not necessary (although it may be provided). Normally, when the fluid pressure in the duct 36 exceeds that in the duct 37, the piston has the position shown, and the pump 30 is at maximum displacement (when permitted by the lever 31), the swash plate being shifted by the spring 93. When, however, the pressures in the ducts 36 and 37 are reversed by any cause — such as by deceleration or retardation of the vehicle means, by operation of the vehicle combination backwards, or by applying a throttling brake valve to throttle the return flow through the duct 37 for braking the trailer — the piston 115 moves to compress the spring 93, pushing the rod 116 and the block 117 against the block 89a to shift the positioning rod 86 and reduce the pump displacement

GENERAL OBSERVATIONS

In both embodiments, the change in displacement effected by the piston 103 or 115 can be prevented by engaging the end of the rod 97 to one of the notches 96. Any displacement change urged by these pistons can be fully, or to a large extent, overridden by manual operation of the lever 31. this is evidently true when the blocks 88 and 89 are inseparable; but these blocks may, in most constructions, be separable, since the forces of the piston rods 79 urge the swash plate 82 torward minimum displacement. Therefore the vehicle operator can select the distribution of power between the mechanical torque to the truck wheels and the hydraulic power to the trailer.

A reduction in the pressure within the duct 37 sufficient to cause movement of the piston 103 or 115 to the positions shown, causes (assuming the lever 31 to be freely movable) the swash plate 82 to return toward or to maximum displacement, by action of the spring 93 aided, when used, by the spring 105.

When a braking valve is interposed in the return duct 37, it is advantageously associated with a means for abstracting heat, e.g., a heat exchanger, and is positioned between the pump 30 and the auxiliary duct 113 or 120.

Opening of the by-pass valve 46 removes all hydraulic power from the hydraulic motor 43. Since the pump operates against almost no opposition, the differential torque divider also imposes substantially no torque to the truck wheels. Thereby the valve 46 is a clutch, and the clutch 24 may, if desired, be omitted.

I claim as my invention:

1. In a self-propelled vehicle means having a power plant, a primary driving element situated on one transverse axis and a secondary driving element situated on another transverse axis, a drive system which includes:
    a. a torque divider having an input drivenly coupled to said power plant, a first output coupled to the said primary driving element, and a second output coupled to a pump, a hydraulic motor coupled drivingly to the secondary driving element, and interconnecting supply and return ducts between the pump and the motor for driving the motor from the pump, and
    b. means sensitive to the pressure within the return duct for increasing the pressure within said duct upon a rise in the pressure therein.

2. The drive means according to claim 1 wherein said means sensitive to the pressure is exposed oppositely to the pressures resulting from the separate pressures in the said supply and return ducts, whereby said means acts to increase the pressure in said return duct in response to an increase in the pressure in the return duct with reference to the pressure in the supply duct.

3. The drive system according to claim 1 wherein said vehicle means is a truck-trailer combination, said primary driving element includes at least one wheel of the truck and said secondary driving element includes at least one wheel of a trailer, said hydraulic motor being mounted on the trailer.

4. The drive system according to claim 1 wherein said means sensitive to the pressure includes a chamber containing a movable piston which is connected by an auxiliary duct to the return duct, wherein said pump has a variable displacement and includes a displacement-changing member, and the said piston is connected to said displacement-changing member to reduce the pump displacement upon a rise in the pressure within said return duct.

5. In combination with the drive system according to claim 1 wherein said pump has a variable displacement and said means sensitive to the pressure in the return duct is connected to vary the pump displacement, means operable from the vehicle means for locking the pump displacement into a selected position, said last-mentioned means being constructed and arranged to be rendered inoperative to permit the first-mentioned means to control the pump displacement.

6. In a self-propelled vehicle means having a power plant, a primary driving element situated on one transverse axis and a secondary driving element situated on another transverse axis, a drive system which includes:
   a. a differential torque divider having an input drivenly coupled to said power plant, a first output coupled to the said primary driving element, and a second output coupled to a pump, a hydraulic motor coupled drivingly to the secondary driving element, and interconnecting supply and return ducts between the pump and the motor for driving the motor from the pump, and
   b. means sensitive to the pressure in the return duct for increasing the pressure within said duct.

7. In a self-propelled vehicle means having a power plant, a primary driving element situated on one transverse axis and a secondary driving element situated on another transverse axis, a drive system which includes:
   a. a differential torque divider having an input shaft drivenly coupled to said power plant, a first output mechanically coupled to the primary driving element, a positive and variable displacement pump mechanically and drivenly coupled to a second output and having a movable displacement-varying member, a hydraulic motor coupled drivingly to the secondary driving element, and interconnecting supply and return ducts between the pump and the motor for driving the motor from the pump, and
   b. means for varying the pump displacement including a movable, pressure-responsive wall connected to said displacement-varying member, walls enclosing a chamber to which said movable wall is exposed, and auxiliary duct means interconnecting said chamber to one of said interconnecting ducts.

8. The combination according to claim 7 wherein said vehicle means is a truck-trailer combination, said primary driving element includes at least one wheel of the truck and the secondary driving element includes at least one wheel of the trailer, said hydraulic motor being mounted on the trailer.

9. The drive system according to claim 8 wherein said chamber is a cylinder and the movable wall is a piston, wherein
   a. said piston is connected to the pump displacement-varying member so as to reduce the pump displacement as the piston moves to expand the space within the cylinder, and
   b. said auxiliary duct means is interconnected between the said cylinder space and the return duct, which return duct is normally at a lower pressure than the supply duct when the vehicle is moving forwardly under power.

10. The drive system according to claim 9 which includes resilient means for urging the piston in a direction to increase the pump displacement.

11. The drive system according to claim 7 wherein
   a. said chamber includes at least one cylinder and the movable wall includes a piston means having opposed faces, said movable wall being connected to the pump displacement-varying member so as to reduce the pump displacement when the wall moves in one direction, and
   b. said auxiliary duct means includes first and second, separate auxiliary ducts interconnecting parts of the cylinder on opposite sides of the piston means with the supply and return ducts so that the pressure within the return duct, which is normally at a lower pressure than the supply duct when the vehicle means is moving forwardly under power tends to reduce the pump displacement.

12. The drive system according to claim 11 which includes resilient means for urging the piston means in a direction opposite to said direction which increased the pump displacement.

13. The drive system according to claim 7 which includes stop means for limiting the extent of movement of the movable wall to a distance less than that which would reduce the pump displacement to zero.

14. The drive system according to claim 7 which includes means operable from the vehicle for varying the displacement of the pump, said means being connected to the displacement-varying member of the pump.

15. The drive system according to claim 7 wherein said said vehicle means is a truck-trailer combination, said primary driving element includes at least one wheel of the truck and the secondary driving element includes at least one wheel of the trailer, said drive system including
   a. means operable manually from the vehicle operator's compartment for varying the pump displacement from low to maximum, and
   b. stop means for limiting the extent of movement of the movable wall to a distance less than that which would reduce the pump displacement to zero.

16. In the drive system according to claim 7, flow-restrictive means interposed in said auxiliary duct means for causing said movable wall to move slowly upon a change in pressure in said interconnecting duct.

* * * * *